United States Patent [19]

Lo et al.

[11] Patent Number: 4,863,604
[45] Date of Patent: Sep. 5, 1989

[54] MICROPOROUS ASYMMETRIC POLYFLUOROCARBON MEMBRANES

[75] Inventors: Lawrence Y. Lo, Fitchburg, Mass.; Dwight J. Thomas, Zionsville, Ind.

[73] Assignee: Parker-Hannifin Corporation, Cleveland, Ohio

[21] Appl. No.: 10,947

[22] Filed: Feb. 5, 1987

[51] Int. Cl.[4] .............................................. B01D 13/00
[52] U.S. Cl. .............................. 210/490; 210/500.36; 264/49
[58] Field of Search ................... 264/49, 127; 210/490, 210/500.36

[56] References Cited

U.S. PATENT DOCUMENTS

| | | | |
|---|---|---|---|
| 3,342,911 | 9/1967 | Funahashi | 264/49 X |
| 3,930,886 | 1/1976 | Mesiti et al. | 264/49 X |
| 4,170,540 | 10/1979 | La Zarz et al. | 264/127 X |
| 4,478,898 | 10/1984 | Kato | 264/127 X |
| 4,588,540 | 5/1986 | Kiefer et al. | 264/49 X |

Primary Examiner—Frank Spear
Attorney, Agent, or Firm—Lyon & Lyon

[57] ABSTRACT

Novel microporous, asymmetric, integral, composite piolyfluorocarbon, e.g., polytetrafluoroethylene, membranes are disclosed. These membranes are made up of two or more sheets of microporous fluorocarbon polymer having different average pore sizes, arranged to provide an increasing gradations in average pore size from one surface of the membrane to the other, and are useful as microfilters for removing fine particle contaminants, including bacteria, from fluids such as those encountered in the electronics and pharmaceutical industries.

14 Claims, 1 Drawing Sheet

MICROPOROUS ASYMMETRIC POLYFLUOROCARBON MEMBRANES

BACKGROUND OF THE INVENTION

1. Field of the Invention

This invention relates to novel microporous polyfluorocarbon membranes. More particularly, this invention relates to novel multilayer microporous polyfluorocarbon membranes, such as polytetrafluoroethylene membranes, which are asymmetric in pore size, i.e., which have an increasing gradation in average pore diameter from one surface of the membrane to the other. These membranes are particularly useful as microfilters, and especially as the filtration components of microfiltration cartridges, which can be used to remove fine particle size contaminants, including bacteria—particles having diameters as small as about 0.001 $\mu$m—from fluids such as those encountered in the electronics and pharmaceutical industries. This invention also relates to a novel process for preparing these microporous asymmetric polyfluorocarbon membranes.

2. Description of the Prior Art

Porous polyfluorocarbon membranes or films, particularly ones fabricated in whole or in part from polytetrafluoroethylene, have been known for twenty-five years or more. Such membranes or films are usually prepared by either of two general methods:

1. Incorporating a particulate, solid, pore forming filler removable by leaching, heating, etc. into a mass of powdered fluorocarbon polymer; shaping the resulting mixture into a preform, calendering the thus-obtained preform to reduce its thickness and form it into a self-sustaining sheet or film, with or without doubling over or cross-lapping the sheet or film between passes through the calender rolls; subjecting the calendered sheet or film to heat to dry the sheet or film and sinter the fluorocarbon polymer particles, and removing the particulate filler; see, for example, U.S. Pat. Nos. 3,281,511 to Goldsmith; 3,518,332 to Sklarchuk et al; 3,556,161 to Roberts; 3,661,645 to Strier et al; 3,773,878 to Jahnke; 3,859,402 to Bintliff et al; 3,864,124 to Breton et al; 3,890,417 to Vallance; 4,003,818 to Juillard et al; 4,196,070 to Chao et al; 4,250,002; 4,297,196 and 4,498,961 to Lazarz et al; 4,292,146 and 4,342,636 to Chang et al and 4,380,521 to Moreno et al, and British Pat. Nos. 943,624 to Doulton & Co. Limited and 1,081,046 to Imperial Chemical Industries Limited.

2. Forming a porous fluorocarbon polymer membrane or film having nodes interconnected by fibrils using processes which involve, for example, stretching a preformed fluorocarbon polymer sheet, or extensively mixing and then biaxially calendering a putty-like mass containing fluorocarbon polymer; see, for example, U.S. Pat. Nos. 3,953,566 and 4,187,390 to Gore; 4,049,589 to Sakane; 4,089,758 to McAloon and 4,153,661 to Ree et al.

Commercially available porous polyfluorocarbon membranes or films made by the first of these methods, incorporation and subsequent removal of a particulate solid, are capable only of coarse filtration, i.e., removal from liquids of particulate matter having average particle diameters of not less than about 1 $\mu$m, and in general also have inadequate strength, flux and dirt holding capacity to be useful in microfiltration applications. Hence, such membranes are used as coarse filters, or as separators or diaphragms in batteries and electrolytic cells.

Although porous polyfluorocarbon membranes or films having polymer nodes interconnected by fibrils have been used for microfiltration, such membranes are not without problems, some of which are attributable to their method of preparation. The membrane can itself be a major source of contamination because of its loosely bound fibrils and nodes. Also, it is difficult to control the processes by which such membranes are typically fabricated so that pore size will be correlated consistently with performance requirements.

There is thus a need for chemically and physiologically inert microporous polyfluorocarbon membranes whose pore structures render them particularly suitable for microfiltration applications.

It is an object of this invention to provide novel microporous polyfluorocarbon membranes.

It is also an object of this invention to provide novel microporous asymmetric polyfluorocarbon membranes useful as filtration means.

Another object of this invention is to provide novel microporous asymmetric polyfluorocarbon membranes, such as polytetrafluoroethylene membranes, whose unique pore structure, high porosity, high strength, high flux, low particle shedding and superior dirt holding capacity make them particularly useful as microfilters, and especially as the filtration components of microfiltration cartridges, which can be used to remove fine particle size contaminants from fluids such as those encountered in the electronics and pharmaceutical industries.

A further object of this invention is to provide a novel process for preparing these microporous polyfluorocarbon membranes.

These and other objects, as well as the nature, scope and utilization of the invention, will become readily apparent to those skilled in the art from the following description, the drawings and the appended claims.

SUMMARY OF THE INVENTION

The novel microporous polyfluorocarbon membranes of this invention are prepared by a variant of the first general method outlined above, incorporation and subsequent removal of a particulate solid, in which the following exceptions are practiced:

1. The powdered fluorocarbon polymer used has an average individual particle diameter (i.e., the average diameter of individual particles in the unaggregated or unagglomerated state) of not more than about 0.3 $\mu$m, e.g., from about 0.1 $\mu$m to about 0.3 $\mu$m, and preferably from about 0.1 $\mu$m to about 0.2 $\mu$m.

2. Similarly, the leachable or otherwise removable particulate, solid, pore forming filler used has an average individual particle diameter of not more than about 20 $\mu$m, e.g., from about 0.01 $\mu$m to about 20 $\mu$m, and preferably from about 0.075 $\mu$m to about 10 $\mu$m.

3. Two or more self-sustaining calendered sheets or films are first prepared in conventional fashion from polyfluorocarbon powders whose average particle diameters fall within the aforementioned ranges for this component, admixed with a leachable or otherwise removable pore forming filler whose average particle diameter likewise falls within the aforementioned ranges for this component. In further contrast to conventional practice the filler used in each such sheet or film will have a different average particle diameter, within the aforementioned ranges, from the filler(s)

used in the other sheet(s) or film(s). Hence, each such sheet or film will, once the pore former is removed, have a different average pore diameter. These calendered sheets or films are then laid up together, with a small pore former-containing sheet or film on one side and progressively larger pore former-containing sheet(s) or film(s) laid on top of it to give an increasing gradation in average pore diameter from one surface of the ultimately-obtained membrane to the other, to form a composite. This composite is then laminated into an integral membrane by application of heat and pressure, sintered, and the filler removed, again in conventional fashion, to give an asymmetric microporous polyfluorocarbon membrane.

DETAILED DESCRIPTION OF THE INVENTION

Figure 1:
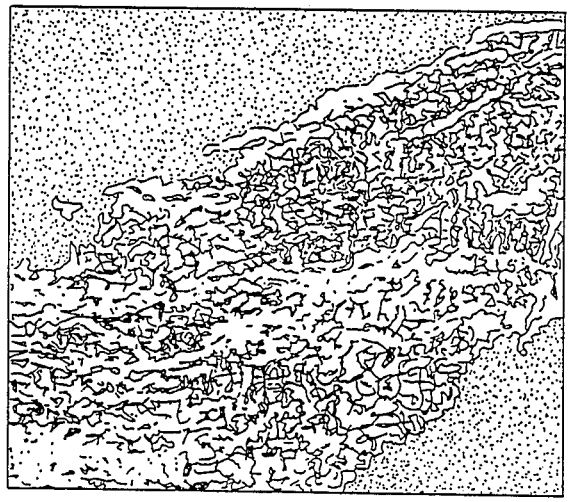
FIG. 1 is a photomicrograph (5,000×magnification) of a cross-section of a single microporous polytetrafluoroethylene sheet or film made from polytetrafluoroethylene powder of 0.2 μm average particle diameter admixed with 0.075 μm average particle diameter calcium carbonate pore-forming filler in accordance with the teachings of this invention.

Included among the fluorocarbon homopolymers and copolymers which can be used to make the novel microporous polyfluorocarbon membranes of this invention are polymers of fluoro (including perfluoro) and chlorofluoro lower alkenes containing 2 to 4 carbon atoms, inclusive, which can be otherwise unsubstituted or substituted with one or more non-interfering substituents, e.g., lower alkoxy groups. Such polymers include polytetrafluoroethylene, polytrifluoroethylene, tetrafluoroethylene/hexafluoroethylene copolymers, poly(fluoroethylene/ethylene) and poly(fluoroethylene/propylene) copolymers, polychlorotrifluoroethylene, poly(chlorotrifluoroethylene/ethylene) copolymers, polyfluoro-lower alkoxyethylenes, polyvinyl fluoride, polyvinylidene fluoride, and the like.

Any leachable or otherwise removable particulate, solid, pore forming filler whose average particle diameter falls within the aforementioned ranges can be employed in practicing this invention. A number of types of removable fillers are disclosed in the above-listed prior art patents which relate to the first general method of preparing porous polyfluorocarbon membranes or films outlined above; see particularly U.S. Pat. No. 3,556,161 to Roberts at from column 2, line 28 to column 4, line 45. Particulate calcium carbonate is especially preferred when practicing this invention.

Methods of reducing removable fillers to the necessary fine particle size for use in practicing this invention include both mechanical and chemical procedures, such as:

mechanical grinding using any of a number of types of grinders, e.g., an air impact pulverizer (jet mill), to produce fine powders; ordinarily the feed material being ground should have an average particle size of below about 50 μm to obtain the best results;

using an aerosol generator, nebulizer or spray drier to produce small droplets of a solution of, e.g., an inorganic salt; evaporation of the solvent from these droplets generates small crystals or particles;

precipitation by adding a component that will react with the original solute in a solution to form an insoluble substance; for example, substantially uniform, very fine calcium carbonate particles can be obtained by adding a boiling solution of calcium chloride to a boiling solution of sodium carbonate;

salting out or recrystallization, in which the solubility of a solute in a solution is sharply reduced by adding a non-solvent for the solute to the solution; for example, fine sodium chloride particles can be produced by adding methanol to an aqueous sodium chloride solution.

The last two of the above-listed particle size reduction methods require careful selection and control of process conditions—types and amounts of chemicals used, concentrations, temperature, pH, mixing rate, etc.—in ways well known to those skilled in the art, to produce pore forming filler particles whose average diameter falls within the aforementioned ranges. The crystalline particles obtained using these methods in a carefully controlled manner attain thermodynamic equilibrium with the solutions from which they are precipitated, recrystallized or salted out while they are very small, and stop growing at that point. Conventional crystal-growing processes produce crystals too large to be used in practicing this invention.

Polyfluorocarbon polymer powders are available commercially in the form of aggregates or agglomerates made up of sub-micron size spherical colloidal particles, i.e., particles having individual diameters within the aforementioned ranges—not more than about 0.3 μm, e.g., from about 0.1 μm to about 0.3 μm, and preferably from about 0.1 μm to about 0.2 μm. These aggregates or agglomerates typically have an average diameter of about 500 μm or more, and must be broken up into discrete powder particles whose average diameters fall within the aforementioned ranges before being used in practicing this invention. The pore former can also form aggregates or agglomerates many times greater in size than the average diameter of the individual filler particles, and in such a case must also be broken up into discrete filler particles before use.

Such aggregates can be broken up in any convenient manner to give the requisite individual small particles. Thus, for example, a high shear homogenizer whose generator rotates at ultra high speed to create a cutting, ripping and demolishing action can be used for this purpose, together with a mixing liquid capable of wetting the surface of the particles and of later being removed by evaporation, extraction or any other convenient method at a temperature below the decomposition temperature of the fluorocarbon polymer. Such mixing liquids include hydrocarbon oils such as kerosene, solvent naphtha, white oil and Isopar H hydrocarbon oil (Exxon Chemical Co.), aromatic hydrocarbons such as toluene and xylene, alcohols, ketones, esters, silicone oils, fluorocarbon oils, organic fluorosurfactants, e.g., Zonyl® FSN fluoroalkyl poly(ethyleneoxy)ethanol nonionic surfactant (duPont), and polymers such as polyisobutylene or polyisoprene, unsaturated monomers, or monomer-polymer syrups in solution in one of the above-mentioned hydrocarbon oils, aromatic hydrocarbons, alcohols or ketones, as well as mixtures of these mixing liquids. The mass ratio of mixing liquid to solid can range from about 2:1 to about 50:1, and preferably from about 6:1 to about 8:1. The mixing liquid also serves as a lubricant for the fluorocarbon polymer particles during subsequent processing.

Operating the high shear homogenizer at about 20,000 rpm for about 3–5 minutes has been found adequate to break up polyfluorocarbon polymer and pore forming filler aggregates and give a slurry of fine powder particles in the mixing liquid. Longer or shorter times at higher or lower speeds can, of course, be used where necessary.

The amount of pore forming filler employed in admixture with powdered fluorocarbon polymer can range from about 60% to about 90% by weight, based on the total weight of these two materials. Preferably, the amount of pore forming filler used will range from about 75% to about 85% by weight, on the same basis, to give optimum combinations of flux, retention and strength in the finished asymmetric membranes.

The method used to prepare individual sheets or films from mixtures of the above-described powdered fluorocarbon polymers and pore forming fillers can be, as indicated above, any method known in the art for this purpose.

One such method involves first forming a slurry of fine powder particles of the fluorocarbon polymer and pore forming filler in a mixing liquid, then filtering this slurry to remove the majority of the mixing liquid, e.g., all but from about 10% to about 25%, and preferably from about 15% to about 20%, of this liquid, and obtain a wetted filter cake.

This filter cake can then be treated in any convenient fashion, e.g., it can be pressed (molded) or paste extruded (using, e.g., an extruder with a reduction ratio below about 50:1), to make a preform whose thickness, although not critical, will usually range from about 0.03 to about 0.25 inch, and preferably from about 0.03 to about 0.10 inch.

The preform is fed to the nip of a pair of calender rolls set to reduce the preform's thickness to from about 10 to about 25 mils, and preferably from about 10 to about 15 mils. The resulting sheet is usually folded over upon itself and calendered again. Calendering, folding, and, if desired, turning the folded sheet to a certain extent, e.g., through 45–90 degrees before recalendering, can be repeated from 2 to 10 times or more to increase uniformity in the thus-formed sheet or film. The nip of the calender rolls is then adjusted downward, usually to below about 3 mil, and the sheet or film is calendered under a pressure of from about 200 to about 3000 lb., with the calender rolls heated to permit a temperature of from about 100°–130° F. to be maintained, to a thickness which will generally range from about 2 to about 8 mils.

Sheets or films whose average pore diameter, once the pore forming filler is removed, ranges from about 0.01 $\mu$m to about 10 $\mu$m, and preferably from about 0.1 $\mu$m to about 5 $\mu$m, will be fabricated as precursors of the novel microporous asymmetric membranes of this invention.

Two or more, e.g., up to as many as seven, of the thus-prepared calendered sheets or films made from the same or different fluorocarbon polymers, each containing sufficient mixing liquid (lubricant) to facilitate binding and lamination of the sheets or films to each other, and a pore forming filler of different average particle diameter from the filler used in the others, are then laid up together, with a small pore former-containing sheet or film on one side and progressively larger pore former-containing sheet(s) or film(s) laid on top of it, to form a composite of such sheets or films. The sheets or films can be laid up with each sheet stacked in the direction in which it was last calendered, or with each succeeding sheet or film stacked at any angle, e.g., 45° or 90°, to the proceeding sheet(s) or film(s). The composite stack of sheets or films is then laminated into an integral composite membrane by application of heat and pressure, e.g., using heated calender rolls, and can also be dried, i.e., have the mixing liquid (lubricant) driven off, during lamination. The amount of mixing liquid (lubricant) in the sheets or films prior to lamination should be between about 5% and about 50% by weight, and preferably between about 10% and about 15% by weight, of the total weight of the stack of sheets. The laminating pressure should be between about 100 psi and about 10,000 psi, and preferably from about 1,000 psi to about 3,000 psi, with temperatures of from about 70° F. to about 250° F. and preferably from about 100° F. to about 115° F., being employed during lamination.

These laminating conditions will be correlated to provide asymmetric membranes which, once they have been sintered and the pore formers removed, will have an increasing gradation in average pore diameter from one surface to the other and will exhibit high porosity, high strength, high flux, low particle shedding and superior dirt holding capacity. Such membranes will have average pore diameters on their small pore sides ranging from about 0.01 $\mu$m to about 1.0 $\mu$m, and preferably from about 0.1 $\mu$m to about 0.5 $\mu$m, and average pore diameters on their large pore sides ranging from about 1 $\mu$m to about 10 $\mu$m, and preferably from about 2 $\mu$m to about 5 $\mu$m.

Figure 2:
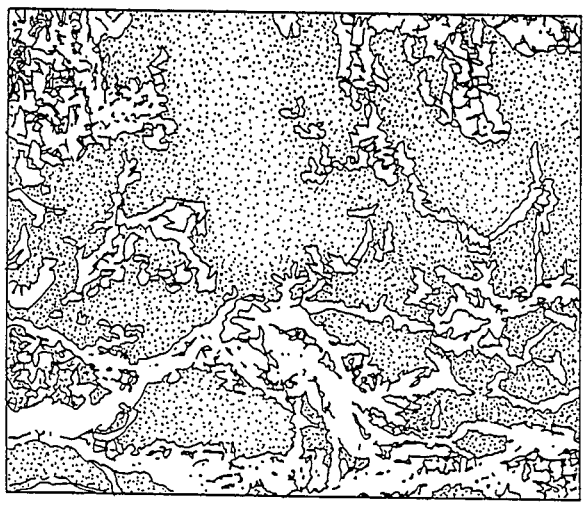
FIG. 2 is a photomicrograph (1,000×magnification) of a cross-section of an asymmetric microporous polytetrafluoroethylene membrane prepared in accordance with the teachings of this invention.

If the films in the stack before lamination are too dry, i.e., if they contain an inadequate amount of lubricant, or if the laminating temperatures and pressures employed are not high enough, the individual sheets or films will not bind together. If, on the other hand, the temperatures and pressures employed are too high, the pore forming filler particles in each sheet or film will be mixed together with those in adjacent sheets or films, and an asymmetric pore structure will not be achieved. Correlation of these conditions, however, is well within the skill of the art and can easily be accomplished by examining photomicrographs of cross-sections of microporous asymmetric membranes whose pore former-containing precursors were formed under particular conditions of temperature, pressure and lubricant content; see, e.g., FIG. 2, to determine asymmetric pore structure, and by measuring the performance characteristics of such microporous membranes.

The thus-obtained precursor membranes can then be oven-dried to remove any remaining lubricant, sintered (in a separate step, or simply by increasing the temperature in the laminating step or in the drying oven, or by sintering the membranes directly without passing through a drying stage), and then contacted with a material which will dissolve out the pore forming filler, heated to remove the filler, etc., each of these steps also being conducted in conventional fashion. Thus, for example, drying to drive off any remaining lubricant can be carried out at temperatures ranging from about 140° C. to about 195° C., and preferably at from about 145° C., and sintering can be effected at temperatures ranging from about 335° C. to about 360° C., and preferably at 340° C. to about 345° C.

The preferred pore forming filler, calcium carbonate, can be leached from the sintered precursor membrane by treatment with aqueous acid, e.g., hydrochloric acid.

Sodium chloride, if used as the pore former, can be removed simply by immersing the precursor membrane in hot water.

The novel microporous asymmetric polyfluorocarbon membranes of this invention, by virtue of the low resistance to fluid flow provided by their very thin control section (the layer or layers of the membrane having the smallest average pore diameters), exhibit higher flux than do conventional stretched porous polyfluorocarbon membranes or films having polymer nodes interconnected by fibrils. While the larger pores found in the other layers of our novel composite membranes offer still lower resistance to fluid flow, these other layers provide strength to the composite structure and, when positioned upstream of the control section, operate as a prefilter to remove contaminants which otherwise could plug the control section. Serial filtration accomplished in this fashion prolongs the useful life of the control section, and thus increases both the dirt holding capacity and the throughput of the filtration medium.

The method by which these novel membranes are made places no large stresses on the sheets or films used to prepare them—in marked contrast to the stretching methods used to make conventional fibril—containing membranes. Consequently, less debris to slough off and contaminate a user's filtration system is found in these novel membranes than in stretched membranes.

EXAMPLE I

Forty grams of precipitated calcium carbonate having an average particle diameter of 0.075 μm, 10 grams of polytetrafluoroethylene powder having an average particle diameter of 0.2 μm and 500 ml of Isopar H hydrocarbon oil were blended for four minutes in a high shear homogenizer operated at 20,000 rpm.

Next the slurry was filtered to make a 0.2 inch thick preform containing 20% by weight of the hydrocarbon oil, and this preform was calendered using the following procedure:

the preform was fed to a pair of calender rolls whose nip was set at 0.02 inch, the resulting sheet was folded once upon itself, rotated 90 degrees and refed to the calender rolls (nip set at 0.02 inch);

the refed sheet was folded once upon itself, rotated 90 degrees and fed again to the calender rolls (nip still set at 0.02 inch);

the twice refed sheet was fed to the calender rolls with the nip set at 0.01 inch, then calendered again with the nip of the rolls set at 0.003 inch.

The thus-calendered sheet was dried for forty minutes at 300° F. in a forced air oven, then sintered for 2 minutes at 650° F. in an infra red oven, and then immersed for 1 hour at room temperature (about 25° C.) in an aqueous 0.3M hydrochloric acid solution to leach out the calcium carbonate pore former. The resulting microporous polytetrafluoroethylene membrane, whose cross-section is shown in FIG. 1, was 75 μm thick, had a porosity of 77% and a methanol flux of 0.66 ml/cm²/min/psi, and retained 99% of the particles from a 0.142 micron polystyrene latex.

EXAMPLE II

The amounts of precipitated calcium carbonate and polytetrafluoroethylene (PTFE) powder listed in Table I below were separately blended with 500 ml portions of Isopar H hydrocarbon oil for four minutes in a high shear homogenizer operated at 20,000 rpm., and each of the resulting slurries was filtered to make an 0.2 inch thick preform containing 20% by weight of the hydrocarbon oil.

Each of the thus-obtained preforms was calendered in the manner described in Example I above and, after calendering, each sheet was rewetted with sufficient Isopar H hydrocarbon oil to give a lubricant content of approximately 15% by weight in the sheet.

The rewetted sheet obtained from slurry B was laid on top of the rewetted sheet obtained from Slurry A, and the resulting composite was fed to a pair of calender rolls whose nip was set at 0.003 inch. The calendered composite was then dried, sintered and leached in the manner described in Example I above.

The resulting asymmetric microporous polytetrafluoroethylene membrane had an average pore size on one side of 0.1 μm, an average pore size on the opposite side of 2.0–3.0 μm, was 130 μm thick, had a methanol flux of 0.40 ml/cm²/min/psi, and retained 97% of the particles from a 0.142 micron polystyrene latex.

TABLE I

| Slurry | Ppt'd. CaCO₃, av. part. diam. 0.075 μm | Ppt'd. CaCO₃, av. part. diam. 3.0 μm | PTFE, av. part. diam. 0.2 μm |
|---|---|---|---|
| A | 37.5 g. | — | 12.5 g. |
| B | — | 45.0 g. | 5.0 g. |

EXAMPLE III

A calendered sheet obtained as described in Example I (before drying, sintering and leaching) is substituted for the sheet obtained from Slurry A in Example II. The sheet of Example I and the sheet obtained from Slurry B are then subjected to the remainder of the procedure of Example II, beginning with the rewetting step, to give an asymmetric microporous polytetrafluoroethylene membrane suitable for use as a microfilter.

EXAMPLE IV

The procedure of Example II is repeated in every detail, except that precipitated calcium carbonate having an average particle diameter of 0.01 μm is substituted for the precipitated calcium carbonate used in Slurry A and precipitated calcium carbonate having an average particle diameter of 5 μm is substituted for the precipitated calcium carbonate used in Slurry B. An asymmetric microporous polytetrafluoroethylene membrane suitable for use as a microfilter is obtained.

EXAMPLE V

The procedure of Example IV is repeated in every detail except for the following:

polytetrafluoroethylene powder having an average particle diameter of 0.1 μm is used in both slurries;

a calendered sheet obtained as described in Example I (before drying, sintering and leaching) is rewetted with sufficient Isopar H hydrocarbon oil to give a lubricant content of approximately 15% by weight in the sheet and then laid on top of the rewetted sheet obtained from Slurry A, which in turn is laid on top of the rewetted sheet obtained from Slurry B. The resulting asymmetric microporous polytetrafluoroethylene membrane is suitable for use as a microfilter.

The above discussion of this invention is directed primarily to preferred embodiments and practices thereof. It will be readily apparent to those skilled in the art that further changes and modifications in the actual implementation of the concepts described herein can be made without departing from the spirit and scope of the invention as defined by the following claims.

We claim:

1. A microporous, asymmetric, integral, composite polyfluorocarbon membrane made up of two or more sheets of aggregated microporous fluorocarbon polymer, said polymer having in the unaggregated state an average individual particle diameter of not more than about 0.3 µm, said membrane having a small pore-containing microporous fluorocarbon polymer sheet having an average pore diameter of from about 0.01 µm to about 1.0 µm as one surface thereof and a sheet or sheets containing larger pores laminated on top of said small pore-containing sheet to give an increasing gradation in average pore diameter from one surface of said membrane to the opposite surface thereof, said opposite surface having an average pore diameter of from about 1 µm to about 10 µm.

2. A membrane as recited in claim 1 having from two to seven microporous fluorocarbon polymer sheets laminated together.

3. A membrane as recited in claim 1 having an average pore diameter on one surface of from about 0.1 µm to about 0.5 µm and an average pore diameter on the opposite surface of from about 2 µm to about 5 µm.

4. A membrane as recited in claim 3 having two microporous fluorocarbon polymer sheets laminated together.

5. A membrane as recited in any one of claims 1–4 in which the fluorocarbon polymer is polytetrafluoroethylene.

6. A process for the preparation of a microporous, asymmetric, composite polyfluorocarbon membrane made up of two or more sheets of microporous fluorocarbon polymer having different average pore sizes which comprises:

(1) preparing two or more self-sustaining, calendered fluorocarbon polymer sheets from fluorocarbon polymer powder having an average individual particle diameter of not more than about 0.3 µm, each of such sheets containing pore forming filler of a different average individual particle diameter from the pore forming filler in the other sheet or sheets, the filler having, in each case, an average individual particle diameter of not more than about 20 µm, and the sheets containing a sufficient amount of a lubricant to facilitate lamination of the sheets to each other, (2) laying up the sheets together, with a small pore forming filler-containing sheet on one side and a progressively larger, pore forming filler-containing sheet or sheets laid on top of said small pore forming filler-containing sheet, to form a composite, (3) laminating the composite into an integral membrane by application of heat and pressure thereto, (4) sintering the laminated composite, and (5) removing pore forming filler therefrom to give a membrane having an average pore diameter of from about 0.01 µm to about 1.0 µm on one surface thereof and a larger average pore diameter of from about 1 µm to about 10 µm on the opposite surface thereof.

7. A process as recited in claim 6 in which the fluorocarbon polymer powder has an average individual particle diameter of from about 0.1 µm to about 0.3 µm.

8. A process as recited in claim 6 in which the pore forming filler has an average individual particle diameter of from about 0.01 µm to about 20 µm.

9. A process as recited in claim 6 in which the fluorocarbon polymer powder has an average individual particle diameter of from about 0.1 µm to about 0.2 µm and the pore forming filler has an average individual particle diameter of from about 0.075 µm to about 10 µm.

10. A process as recited in claim 9 in which two self-sustaining, calendered fluorocarbon polymer sheets are laminated together.

11. A process as recited in claim 6 in which the pore forming filler is present in an amount of from about 60% to about 90% by weight, based on the total weight of the pore forming filler and the fluorocarbon polymer.

12. A process as recited in claim 6 in which from two to seven self-sustaining, calendered fluorocarbon polymer sheets are laminated together.

13. A process as recited in claim 6 in which the lubricant is present in an amount of from about 5% to about 50% by weight, based on the total weight of the sheets.

14. A process as recited in any one of claims 6–13 in which the fluorocarbon polymer is polytetrafluoroethylene.

* * * * *